Figure 1:
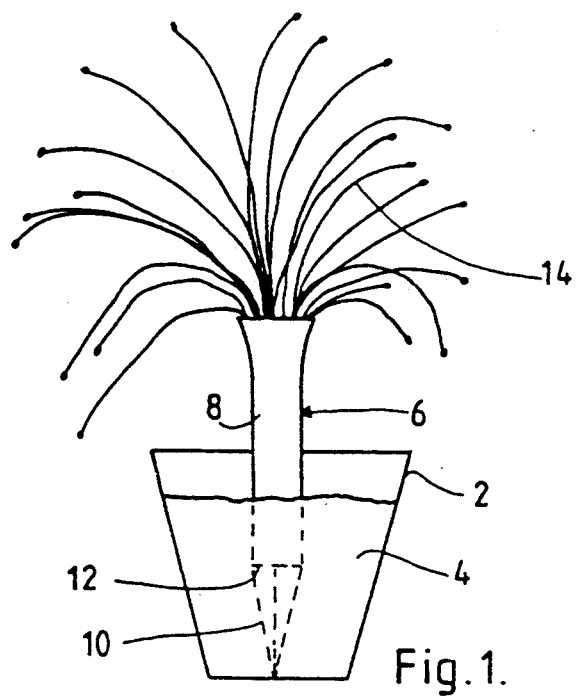

United States Patent [19]

Thomsen

[11] Patent Number: 5,172,517
[45] Date of Patent: Dec. 22, 1992

[54] PLANT TUBE FOR USE IN FLOWER POTS

[75] Inventor: Knud H. Thomsen, Mörke, Denmark

[73] Assignee: Poul Timmermann, Otterup, Denmark

[21] Appl. No.: 730,601

[22] Filed: Jul. 16, 1991

Related U.S. Application Data

[63] Continuation of Ser. No. 250,612, Sep. 29, 1988.

[51] Int. Cl.⁵ .................................. A45B 9/04
[52] U.S. Cl. ........................................ 47/83; 47/75
[58] Field of Search ............... 47/63, 70, 79, 82, 83, 47/75

[56]           References Cited

U.S. PATENT DOCUMENTS

| | | | |
|---|---|---|---|
| 3,063,196 | 11/1962 | Pauer | 47/82 |
| 3,183,624 | 5/1965 | Swett | 47/83 |
| 3,804,331 | 4/1974 | Levey | 47/75 |
| 4,736,546 | 4/1988 | Erdmann | 47/82 |
| 4,825,592 | 5/1989 | Earls | 47/82 |
| 5,044,120 | 9/1991 | Couch | 47/75 |

FOREIGN PATENT DOCUMENTS

| | | | |
|---|---|---|---|
| 1309142 | 11/1962 | France | 47/63 |
| 2292419 | 11/1974 | France | 47/63 |

*Primary Examiner*—Henry E. Raduazo
*Attorney, Agent, or Firm*—Antonelli, Terry, Stout & Kraus

[57]           ABSTRACT

A special production pot includes a upstanding portion and a conical center depression for accepting lower pointed end of a plant tube. The bottom edge of the plant tube is elevated well above the top of the upstanding pot portion of the special production pot in order to provide for clearance for the plant's roots to grow in the substrate of the pot. Thus, the plant can be grown in this manner in a truck garden. When the plant has grown to a sufficient size for sale, the special production pot and plant tube is placed within a sales pot. Thus, the combined special production pot and the sales pot can be delivered to the customer.

3 Claims, 2 Drawing Sheets

PLANT TUBE FOR USE IN FLOWER POTS

This application is a continuation application of application Ser. No. 07/250,612 filed Sep. 29, 1988.

The present invention relates to a plant tube for use in flower pots. Some species of plants, e.g. ivy and Scirpus, grow in a more or less loose hanging manner, and for presenting these plants in an improved manner it is already customary to let them grow up from a relatively narrow tube, which is stuck down into a central area of the earth or growing medium in an ordinary plant pot. As the plant grows it may then rise over the upper edge of the narrow tube and thus become "hanging" from an increased height.

In practice the tube is mounted and filled partially with a growth medium, and the plant is supplied to this medium as a sprout or a seed. The roots, of course, grow downwardly and may gradually project through the lower end of the tube and into the surrounding growth medium of the pot.

Thus, the lower end portion of the tube should be provided with holes located somewhat spaced above the bottom of the pot. It is customary that this is achieved by shaping the tube such that its lower end portion, in which side holes are provided, is narrowing conically downwardly to form a pointed end portion, whereby the tube is easy to stick down into the earth filled pot.

Such tubes are used in large numbers and should of course be produced in a cheap manner, preferably by die casting of a cheap plastic material. The provision of the said holes in the conical end portion may cause some troubles with respect to the formation of thin material fins projecting inwardly from the hole edges towards the center of the respective holes, and seen in the axial direction of the tube such fin portions will greatly reduce the available penetration area of the roots. Already the holes themselves do not provide for any large penetration area, since the area of the remaining wall of the conical tube end portion is of about the same size as the total area of the holes.

It is the purpose of the invention to provide a plant tube which has an advantageous shape and is easy to produce.

According to the invention the tube has a generally non-narrowing shape adjacent its lower end and is provided with one or more downwardly projecting protrusions of a thin-walled planer or part-cylindrical shape. In this context the term "thin-walled" will refer to a wall thickness of the same magnitude as the wall thickness of the tube itself. In this manner the tube may show a wide aperture at the lower end thereof, such that the roots may seek downwardly practically without any obstruction.

Figure 2:
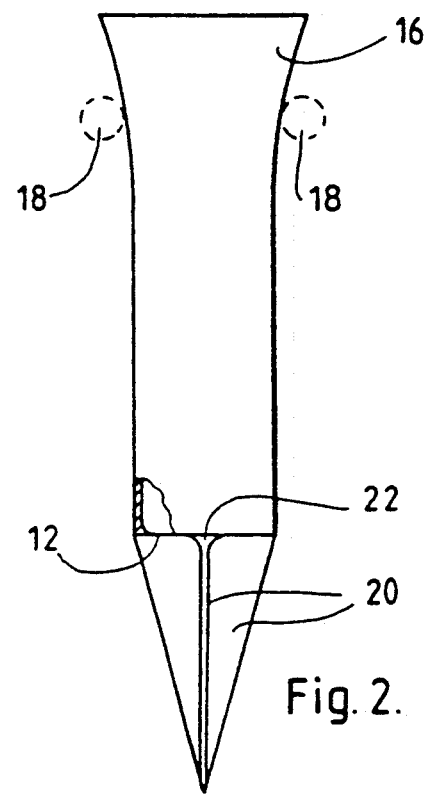
Figure 3:
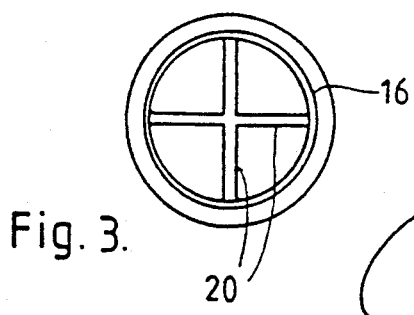
Figure 4:
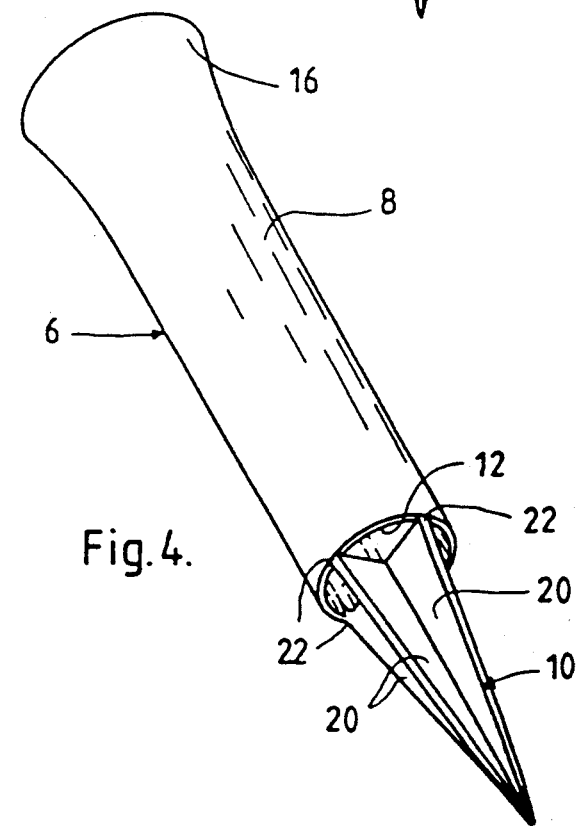
Figure 5:
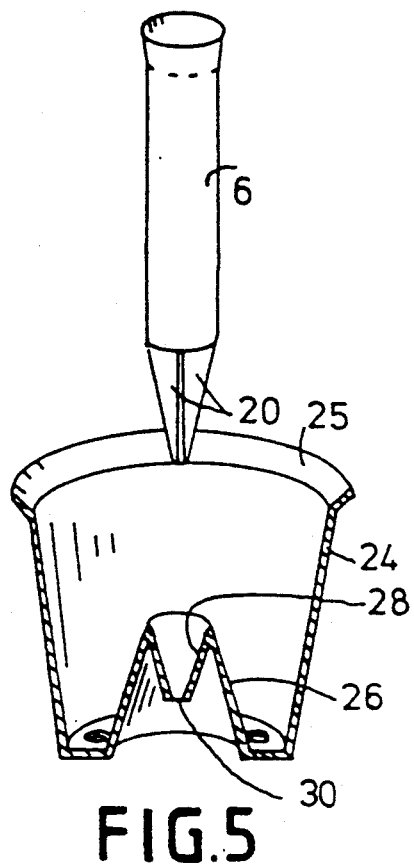
Figure 6:
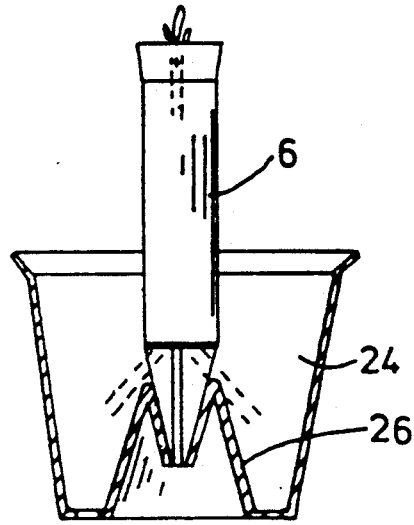
Figure 7:
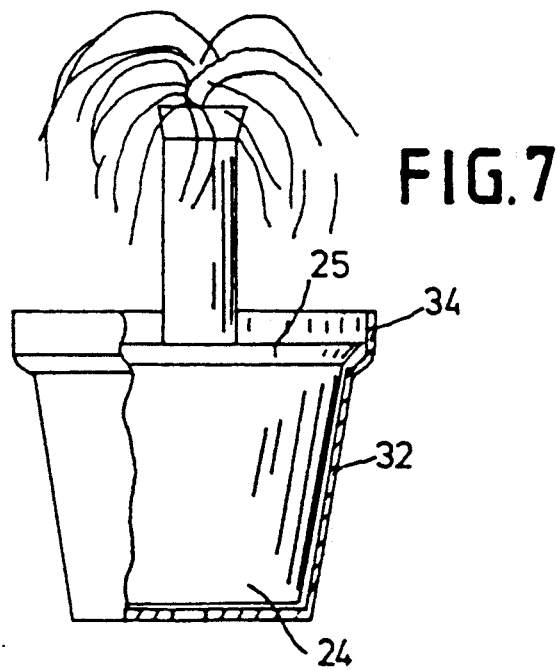

In the following the invention is described in more detail, by way of example, with reference to the drawing, in which:

FIG. 1 is a schematic side view of a plant pot fitted with a tube according to the invention, FIG. 2 is a side view of the tube itself, FIG. 3 is an end view of the tube, seen from the top thereof, FIG. 4 is a perspective view of the tube, FIG. 5 is a perspective view, partly in section, of a special production pot for use with the plant tube, FIG. 6 is a sectional view of the production pot and the plant tube in joined condition, and FIG. 7 is a lateral, partly sectional view of a pot and tube assembly with a plant ready for sale.

The plant pot of FIG. 2 is provided with a growth medium 4, and in the middle thereof is planted a tube member 6 having an upper tube portion 8 and a lower pointed portion 10 projecting downwardly from the lower edge 12 of the tube portion 8. The tube member 6 prefilled with a growth medium is stuck into the medium 4 until the lower end of the pointed portion hits the bottom of the pot, whereby the tube member is known to assume a correct height position, when it is otherwise adapted to the size of the pot.

The growth medium inside the tube 8 holds a sprout or a seed of the relevant type, and after a while the pot with the developed plant 14 is ready for delivery from the greenhouse or truck garden. The roots of the plant have grown down through the lower tube end 12 and into the medium 4.

The tube member 6 as shown in FIGS. 2–4 has a top portion 16 of enlarged diameter, whereby it is able to be suspended between two opposed carrier rods or edges, shown at 18 in dotted lines in FIG. 2, for the purpose of being filled with its growth medium prior to its mounting in the plant pot. The pointed portion 10 is constituted by a cross plate structure comprising four radial wing plates 20, which are each secured to the lower edge 12 of the tube portion 8, at respective areas 22.

The wing plates 20 will contribute to stabilize the tube member 6 in the plant pot, and with their pointed shape they will facilitate the sticking down of the tube member into the pot.

It will be appreciated that the lower end of the tube portion 8, as most clearly shown by FIG. 3, will show a wide total light, the presence of the wing plates 20 giving rise to but a small area reduction, whereby the roots are free to grow straight downwardly out of the tube.

The illustrated tube member is easy to produce by die casting from some cheap thermoplastic material.

The wing plates 20 should not necessarily be downwardly pointed, and there may be more or less than just four of the radial plates. The "open" lower portion 10 should not even necessarily be constituted by "radial plates", as these plates may be substituted e.g. by downwardly projecting, mutually spaced axial legs or other prolongations of the wall material of the tube portion 8, whereby the bottom hole of the tube will be left entirely open, though with some restriction in the growing path of the roots outwardly from the area underneath the tube portion 8. For simplicity such legs may be axial prolongations of the tube 8, i.e. having a part-cylindrical cross section.

On the other hand, the illustrated preferred shaping principle with four—or three or five—radial wings 20 meeting along a centrally disposed axial line area is very advantageous both for a good stability of the structure 10 and for an easy integrated production of the structures 8 and 10, without the lower end of the tube 8 being widely closed by the structure 10 or by casting fins.

The plant tube 6, as shown in FIG. 1, will be usable merely by insertion in the substrate of an ordinary plant pot 2, but in a preferred embodiment of the invention the plant tube is used in a system comprising a special pot, as illustrated in FIGS. 5-7.

According to customary practice the plant tubes are filled entirely or partially with a substrate, in which the plant is sowed or planted, and the tubes are then mounted in substrate filled pots, in which they are laterally supported by the substrate. The pots thereafter constitute production units, the plants of which are grown in the truck graden into a condition ready for sale, whereafter the said production units are used directly as sales units.

There are two problems connected herewith, viz. partly that the sales unit will almost inevitably be smudged by rests of liquid manure from the prehistory of the sales unit as a production unit, and partly that for the truck garden personnel it may be difficult to mount the plant tubes in the pots in reasonably well centered positions therein, as the units are produced or prepared in large numbers and require a rapid handling with respect to the mounting of the plant tubes. It would of course be possible to make use of centering templates or other guiding means for achieving a well centered mounting of the plant tubes in ordinary pots, but such auxiliaries would enevitably involve additional costs without solving problems other than the problem of a well centered mounting of the plant tubes.

In connection with the invention, however, it has been realized that the centering problem may be solved in an economically acceptable manner, viz. by a concurrent solving of the other of the said two problems, the smudged sales unit.

According to this aspect of the invention it is prescribed that for the growing of the plant in the truck garden a special production pot be used, which is made from a cheap plastic material and is shaped with a bottom portion comprising an upstanding shell portion having a centrally disposed depression operable to receive the lower, pointed end of the plant tube so as to facilitate a centered positioning thereof; hereby a correct and rapid mounting of the plant tubes will be greatly facilitated, but it is also achieved that the said smudging problem can be overcome in that the very cheap production pot, when ready for sale, is placed in a new conventional sales pot, whereby the sales unit will appear as a clean pot without the production pot having to be cleaned at all.

Thus, the use of the particular, cheap production pot will solve two relevant problems, whereby it is advantageously applicable.

It would of course be possible to make use of but a single pot, i.e. a combined production and sales pot provided with the said bottom arrangement for a centering reception of the plant tube, but even though the relevant plant pots are sold in millions such special sales pots would still amount to a relatively minor product, which cannot possibly be produced in any profitable manner by each and all pot manufacturers. However, the said special production pot may be manufactured in large numbers and in but a few different sizes by one or a few specialized entities such that these few types or sizes of production pots may fit into several, more expensive sales pots originating from different sales pot manufacturers. The special production pots may thus still be produced as very cheap units, made e.g. from reuse plastic by means of simple die casting tools that are not worked for producing any attractive surface of the pot members. The sales pots, in their turn, may remain unchanged, as standard products showing an attractive outer surface.

The said special production pot as shown in FIGS. 5 and 6 and designated 24 is of a normal pot shape except that its bottom portion is shaped with an upstanding shell portion 26 provided with a conical central depression 28, the lower pointed end of which may be cut away as shown at 30. The pot is die cast from a cheap reuse plastic by means of cheap shaping tools, which by way of example, may provide the pot with an outside appearance that would be quite unacceptable for a sales pot. As mentioned, however, the pot 24 is intended for use as a production pot only.

It will be appreciated that the depression 28 makes it easy for the operator to place the plant tube 6 in a correctly centered position in the pot, as shown in FIG. 6. The depression accommodates the lower end portion of the structure 10 such that the bottom edge 12 of the plant tube will still be raised well above the top of the upstanding pot portion 26 in order to provide for clearance for the plant roots to grow out into the substrate of the pot. The plant can be grown in this pot in the truck garden, and it is unimportant that the production pot is hereby smudged by the watering and handling of the pot.

When the plant has grown to be ready for sale the entire unit shown in FIG. 6 is placed in a sales pot 32 as shown in FIG. 7. The sales pot may be an existing standard product that is used also for many other types of plants without the use of a plant tube 6, whereby, due to very large production figures, also these pots may be produced reasonably cheap, with an appearance which is acceptable for sales purposes, e.g. with a smooth and dull surface. The combined unit may thus be delivered in a sales pot 32, which is not smudged during the growing of the plant, i.e. the unit can be delivered without any attempt at cleaning it.

The production pot 24 is preferably shaped with an upper, outstanding collar 25, and it may be shaped such that it will fit reasonably or sufficiently accurately in several different makes of sales pots 32. Normally these pots have an upper collar or shoulder 34, on which the production pot collar 25 may hang, whereby it is unimportant whether or not the production pot will reach down to the bottom of the sales pot. Also, the inner collar 25 may center the production pot 24 in the sales pot 32 reasonably accurately, also when the pot 24 is rested primarily by standing on the bottom of the pot 32; it should not, however, extend beyond the top of the outer pot 32. In practice, therefore, but a few different sizes of the production pots 2 may be used with a wide variety of commercial sales pots 32.

The invention is not limited to the embodiments shown in the drawing, already because the lower end of the plant tubes 6 may be shaped otherwise, e.g. for cooperation with an upwardly pointed structure 26 at the bottom of the production pot. Also, the plant tube 6 may be made as an integral part of the production pot; the plant tube should have a nice looking appearance, but even if it is made from reuse plastic it may be provided with an attractive surface, e.g. by cork dust or small cork pieces secured by glueing.

Also, it will be within the scope of the invention to produce the special production pot in a quality rendering it usable directly as a sales pot, although it may then have to be cleaned before delivery.

I claim:

1. A plant pot adapted for accommodating an upstanding, relatively narrow plant tube in which a plant is grown, the plant pot comprising a bottom portion, an upstanding portion provided in said bottom portion adapted to receive a lower end of the plant tube, and adapted to support the plant tube in a centered portion of the plant pot, and wherein said upstanding portion comprises a centrally upstanding shell portion having a centrally disposed conical depression and adapted to engage a downwardly pointed end of the plant tube.

2. A plant pot according to claim 1, wherein said plant pot in fashioned of a recycable plastic, mounted the plant pot with the upstanding portion mountable on a carrier pot of a conventional plant pot when the plant has been grown to a ready for sale condition.

3. A plant pot adapted for accommodating an upstanding, relatively narrow plant tube in which a plant is grown, the plant pot comprising a bottom portion, an upstanding portion provided in said bottom portion adapted to receive a lower end of the plant tube, and adapted to support the plant tube in a centered portion of the plant pot, and wherein said plant pot is fashioned of a recycable plastic, the plant pot with the upstanding portion being mountable on a carrier pot of a conventional plant pot when the plant has been grown to a ready for sale condition, and wherein said upstanding portion comprises a centrally upstanding shell portion having a centrally disposed conical depression and adapted to engage a downwardly pointed end of the plant tube.

* * * * *